No. 893,208. PATENTED JULY 14, 1908.
J. R. VAN DYNE.
DISINFECTING APPARATUS.
APPLICATION FILED FEB. 8, 1908.
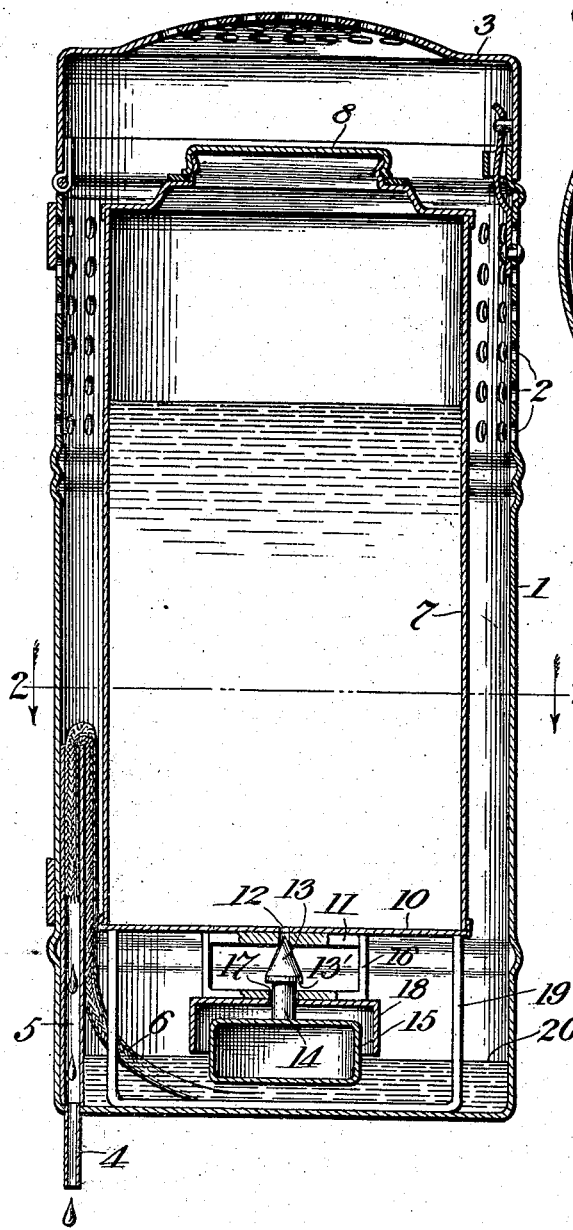
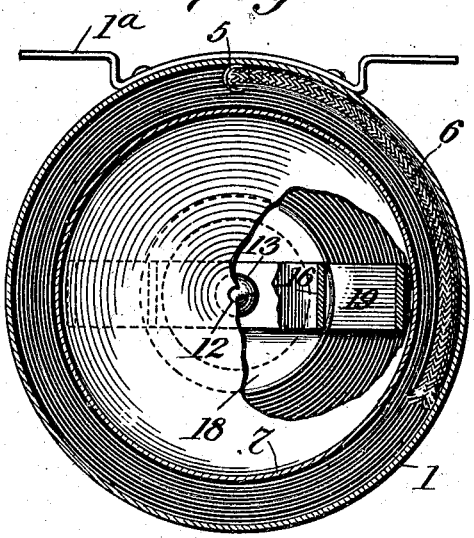
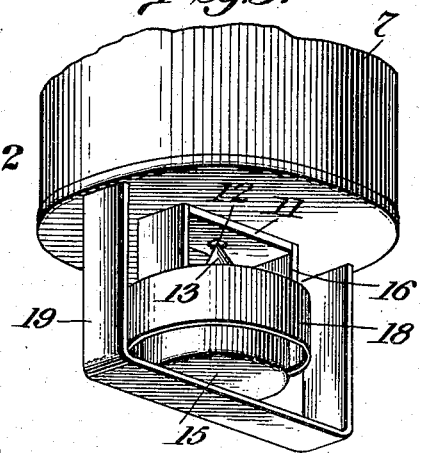
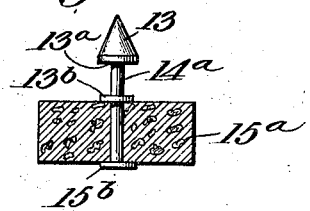
Witnesses
J. Frank Culverwell
J. Hanson Boyden
Inventor,
John R. Van Dyne,
By G. Howlett Davis
Attorney.

UNITED STATES PATENT OFFICE.

JOHN R. VAN DYNE, OF SEDALIA, MISSOURI.

DISINFECTING APPARATUS.

No. 893,208.  Specification of Letters Patent.  Patented July 14, 1908.

Application filed February 8, 1908. Serial No. 414,957.

*To all whom it may concern:*

Be it known that I, JOHN R. VAN DYNE, a citizen of the United States, residing at Sedalia, in the county of Pettis and State of Missouri, have invented certain new and useful Improvements in Disinfecting Apparatus, of which the following is a specification.

My invention relates to disinfecting apparatus, and particularly to apparatus designed to supply disinfecting liquid automatically and continuously to places where it is required. Such apparatus commonly comprises an outer casing adapted to be secured in the desired position, and an inner container or reservoir in which is placed the liquid disinfectant. This inner container is often constructed with an air tight cover and so arranged that the flow of the liquid from a tube in the lower end thereof is controlled by atmospheric pressure. This arrangement is objectionable in that its operation is dependent upon the container being absolutely air tight. Should a small leak occur the entire contents of the container will run out.

It is the primary object of the present invention therefore to provide an apparatus of this character in which the flow of liquid is entirely independent of atmospheric pressure and in which it is unnecessary to provide an air tight cover for the container.

A further object of the invention is to provide an improved form of float valve for controlling the flow of liquid from the container to the outer casing, by means of which the level of the liquid in the outer casing may be maintained approximately constant. By this arrangement a uniform feeding of the liquid from the outer casing will result, regardless of the amount of liquid in the container.

With the above objects in view and to improve generally upon the details of such apparatus, my invention consists in the construction and arrangement of parts hereinafter described, and illustrated in the accompanying drawings, in which Figure 1 is a central longitudinal section through the complete apparatus. Fig. 2 is a transverse section on the line 2—2 of Fig. 1, parts being broken away. Fig. 3 is a perspective view of the lower end of the container and valve mechanism. Fig. 4 is a detail showing a modification.

Referring to the drawings in detail my improved apparatus comprises the usual outer casing 1 provided with ventilating openings 2 and having the hinged perforated cover 3. This casing is adapted to be secured in position by means of a suitable bracket 1ª.

Through the bottom of the casing extends a discharge tube 4, and above this on the inside of the casing, is arranged a wick tube 5. A wick 6 projects into the upper part of this tube and extends downwardly into the casing so as to rest upon the bottom thereof, as clearly shown in Figs. 1 and 2.

The inside container is designated by the numeral 7 and may be provided with a cover 8, which however, does not necessarily fit with an air tight joint, as its only purpose is to prevent the liquid from spilling when the apparatus is employed on railway cars and the like. To the bottom 10 of the container is soldered or otherwise secured a plate 11, and a small circular hole 12 is made through this plate and the bottom 10 of the container. It will be noted that this opening 12 has square edges, that is to say, the edges are not beveled. The opening in the plate 11 serves to form a valve seat for a conical needle valve 13, carried on a valve stem 14, which valve stem is secured at its lower end to a float 15. This float may be of any suitable construction and is preferably formed of sheet metal. The valve stem 14 passes through an opening 17 in a bracket 16 secured to the bottom of the container, and is provided with a shoulder 13' which serves to limit the movement of the valve away from its seat. An inverted cup-shaped protector or shield 18 is secured to the bracket 16 and overhangs the float 15, so as to form a housing therefor, as clearly shown in the drawings. A second bracket 19 of such dimensions as to embrace the valve mechanism, is secured to the bottom of the container and, resting upon the bottom of the casing, serves as a support for the container.

In Fig. 1 I have shown the float as constructed of sheet metal and the valve stem as soldered thereto, but if desired, the float may be constructed of cork or other like material as shown in Fig. 4, and in this case pins or washers 15ᵇ would be employed to secure the same in position.

The operation of the apparatus is obvious. When the container is first filled the valve is in the position shown in Fig. 3 and the liquid flows out through the opening 12 and collects in the bottom of the casing. When however the liquid rises to about the level indicated at 20 in Fig. 1 the valve 13 is raised by the float 15 against its seat, and the flow of liquid from the container is thus shut off. From the casing the liquid is fed by means of the wick 6, slowly and continuously through the discharge tube 4. As soon as the liquid level in the casing has fallen a little, the valve 13 is lowered by the float so as to again allow the liquid to flow through the opening 12 until the normal level is restored. By thus maintaining the liquid at a constant level in the casing it is fed by the wick always at a uniform rate regardless of whether the container be full or nearly empty.

The plate 11 is preferably constructed of relatively soft material such as brass, while the needle valve 13 is of harder material such as steel. From this it will be readily seen that any tendency that the plate 11 may have to wear, will result in the valve 13 forming for itself a tightly fitting seat. It has been found that by providing the valve seat with square sharp edges, a much better seal can be effected than were the edges beveled in an effort to fit the cone shaped valve.

From the foregoing it will be obvious that I have provided a very simple and efficient mechanism for feeding disinfecting liquid at a uniform rate and it is thought the numerous advantages of my apparatus will be readily appreciated by those skilled in the art.

What I claim is:—

1. Disinfecting apparatus comprising a casing, a container therein, means for supporting said container above the bottom of said casing, the bottom of said container being provided with an opening, a needle valve controlling said opening, a float to which said valve is rigidly secured, and a bracket through an opening in which the stem of said valve passes, said stem being formed with a stop or shoulder adapted to engage the bracket, and limit the movement of said valve away from its seat.

2. Disinfecting apparatus comprising a casing, a removable container therein supported above the bottom thereof, the bottom of said container being provided with an opening and valve seat, a valve coöperating with said seat, a float to which said valve is rigidly attached, and means carried by said container and extending between the valve and float for guiding said valve and limiting its movement away from its seat.

3. Disinfecting apparatus comprising a casing, a container therein supported above the bottom thereof, a valve seat formed in the bottom of said container, a valve coöperating with said seat, a bracket secured to said container through which the stem of said valve passes, a float secured to the lower end of said valve stem, and an inverted cup-shaped shield or housing carried by said bracket, and enveloping said float.

4. Disinfecting apparatus comprising a casing, a container therein, supported above the bottom thereof, a valve seat formed in the bottom of said container, a valve coöperating therewith, a float carrying said valve, and a shield of greater diameter than the float disposed between said valve seat and float and overhanging the latter.

5. Disinfecting apparatus comprising a casing, a tube vertically arranged in said casing and extending through the bottom thereof, a wick fitted in the upper end of said tube, and depending therefrom so as to lie on the bottom of said casing, a container in said casing supported above the bottom thereof, a valve seat formed in the bottom of said container, a needle valve coöperating with said seat, means for limiting the movement of said valve, and a float to which said valve is rigidly attached, said float serving to close said valve when the liquid in the casing reaches a predetermined level, whereby said level is maintained practically constant, and the feed from the wick rendered uniform.

In testimony whereof I have affixed my signature in presence of two witnesses.

JOHN R. VAN DYNE.

Witnesses:
WALTER J. KENNEDY,
WM. B. CHALLACOMBE.